United States Patent [19]
Takiguchi et al.

[11] Patent Number: 5,818,545
[45] Date of Patent: Oct. 6, 1998

[54] REMOTE COMMAND LIGHT RECEIVING WINDOW ARRANGED IN LOGO ON FRAME AROUND TELEVISION SCREEN

[75] Inventors: Tomoyasu Takiguchi, Kanagawa; Takeshi Nakajima, Tokyo, both of Japan

[73] Assignee: Sony Corporation, Tokyo, Japan

[21] Appl. No.: 855,742

[22] Filed: May 8, 1997

Related U.S. Application Data

[63] Continuation of Ser. No. 536,255, Sep. 29, 1995, abandoned.

[30] Foreign Application Priority Data

Oct. 4, 1994 [JP] Japan .................................. 6-263295

[51] Int. Cl.⁶ ...................................................... H04N 5/72
[52] U.S. Cl. ......................... 348/734; 348/836; 348/787; 348/789
[58] Field of Search .................................... 348/836, 839, 348/787, 789, 734; 312/7.2; H04N 5/72, 5/64, 5/655

[56] References Cited

U.S. PATENT DOCUMENTS 5,293,244  3/1994  Kawaguchi .............................. 348/789
5,363,149  11/1994  Furuno et al. ........................... 348/789

*Primary Examiner*—Glenton B. Burgess
*Attorney, Agent, or Firm*—Jay H. Maioli

[57] ABSTRACT

An electronic apparatus wherein a light receiving window is formed in a cabinet for passing therethrough an input command signal supplied from a remote commander to execute various control actions, so that desired operations can be performed by manipulating the remote commander. The window is formed in a blank portion of and/or between characters/figures inscribed on the cabinet or on a logo plate attached to the cabinet. A light sensor or a light emitter is disposed in a stage posterior to the light receiving window. When the apparatus is applied to a television receiver or a projector embedded in a wall by user's customization in a manner that only a display screen and a frame thereof are seen on the wall, the external design is not spoiled while the command signal from the remote commander can still be inputted properly.

5 Claims, 8 Drawing Sheets

REMOTE COMMAND LIGHT RECEIVING WINDOW ARRANGED IN LOGO ON FRAME AROUND TELEVISION SCREEN

This is a continuation of application Ser. No. 08/536,255 filed Sep. 29, 1995, now abandoned.

BACKGROUND OF THE INVENTION

1. Field of the Invention

The present invention relates to an electronic apparatus where a light receiving window is formed in a cabinet to receive an input command signal supplied from a remote commander.

2. Description of the Related Art

Recently, there is available an increased volume of AV software (such as music, movie and so forth) containing high-definition video and impressive audio recorded in a wide dynamic range, and users are enabled now to appreciate desired music or movie in a so-called home theater by reproducing such AV software at home. Particularly by the use of a projection television set with a large screen and high-output loudspeakers, it becomes possible to achieve considerably superior theater-reality with an enhanced feeling of unified video and audio effects.

FIG. 6 illustrates an external view of a rear projection television set adapted for use in such a home-theater AV system.

In this view, reference numeral 20 denotes the entirety of a projection television set. There are included therein a cabinet 22 constituting the projection television set; a screen 23 composed of a lenticular lens, Fresnel lens or the like; a frame 24 bordering the periphery of the screen 23; and a front door 25 disposed on the front face of the cabinet 22 to conceal video and audio input/output terminals and so forth.

There are further included an operating panel 26 disposed on the front face of the cabinet 22; an operating element group 27 where various elements are arranged to be manipulated for adjusting the sound volume, changing channels and so forth in the operating panel 26; a light receiving window 28 for receiving an input infrared command signal supplied from an unshown remote commander; and a loudspeaker compartment 29 positioned in a lower region of the cabinet 22 and housing loudspeakers therein.

With the current proliferation of home theaters employing such a projection television set 20 shown in FIG. 6, it is currently proposed to realize an arrangement where a user individually customizes a unique AV system constituting a home theater and installs the same in his room.

In an exemplary arrangement, the above-described projection television set 20 is embedded in a wall of a room in such a manner that only the display screen 23 and the frame 24 alone are unconcealed and seen on the wall.

FIG. 7 illustrates the parts of the projection television set 20 seen on the wall due to such customization. Only those parts denoted by solid lines are seen on the wall, whereas almost the entire cabinet 22 inclusive of the operating panel 26 and so forth are concealed inside the wall with the exception of the screen 23 and the frame 24.

Therefore the interior of the room is rendered remarkably simple, and the screen 23 can be constructed similarly to one installed in a movie theater or the like.

However, since any parts other than the screen 23 and the frame 24 are concealed in the wall, the light receiving window 28 for inputting a command signal from a remote commander is also concealed to consequently fail in receiving the input command signal.

FIG. 8 is a sectional view taken along the line 8—8 in FIG. 7. In this diagram, there are shown a wall portion W concealing any parts other than the screen 23 and the frame 24, an infrared sensor 31, a printed circuit board 32 where the infrared sensor 31 is mounted, a board holder plate 33 for holding the printed circuit board 32, a support 34 for a screw N which fastens the board holder plate 33, a light guide tube 35 for guiding the input command signal from the light receiving window 28 to the infrared sensor 31, and a bracket 36 for holding the light guide tube 35.

As illustrated in FIG. 8, since the light receiving window 28 is concealed in the wall, the command signal indicated by an arrow is interrupted by the wall W and fails to reach the infrared sensor 31. Consequently it becomes impossible to perform various operations for changing channels, adjusting the sound volume and so forth. In order to eliminate this drawback, there may be devised a means of disposing the light receiving window 28 in the frame 24, but this raises another problem that the light receiving window 28 is rendered conspicuous brings about a disadvantage in appearance.

Furthermore, due to the necessity of the light guide tube 35, the bracket 36 for holding the tube is also needed which consequently increases the number of required component elements, hence increasing the number of processing steps and raising the production cost as well.

SUMMARY OF THE INVENTION

It is therefore an object of the present invention to provide an improvement in an electronic apparatus where a light receiving window is formed in a cabinet thereof to receive an input command signal supplied from a remote commander, and various operations are possible by manipulation of the remote commander. In the improved electronic apparatus, the light receiving window is formed in a blank portion of and/or between characters/figures inscribed on the cabinet.

The light receiving window may be formed in a blank portion of and/or between characters/figures inscribed on a logo plate attached to the cabinet, or in a blank portion of and/or between characters/figures printed on the cabinet, or in a blank portion of and/or between characters/figures molded three-dimensionally on the cabinet.

Further a light sensor means or a light emitter means is disposed in a stage posterior to the light receiving window.

According to the improvement where the light receiving window is formed in a blank portion of or between characters/figures inscribed on the front face of the apparatus cabinet, it becomes possible to realize advantageous use of the electronic apparatus in such a manner that, even when the apparatus is embedded in a wall of a room for example, various manipulations can still be performed for operations without spoiling the external design of the apparatus.

The above and other features and advantages of the present invention will become apparent from the following description which will be given with reference to the illustrative accompanying drawings.

DESCRIPTION OF THE PREFERRED EMBODIMENT

Hereinafter a preferred embodiment of the electronic apparatus of the present invention will be described in detail with reference to the accompanying drawings.

Figure 1:
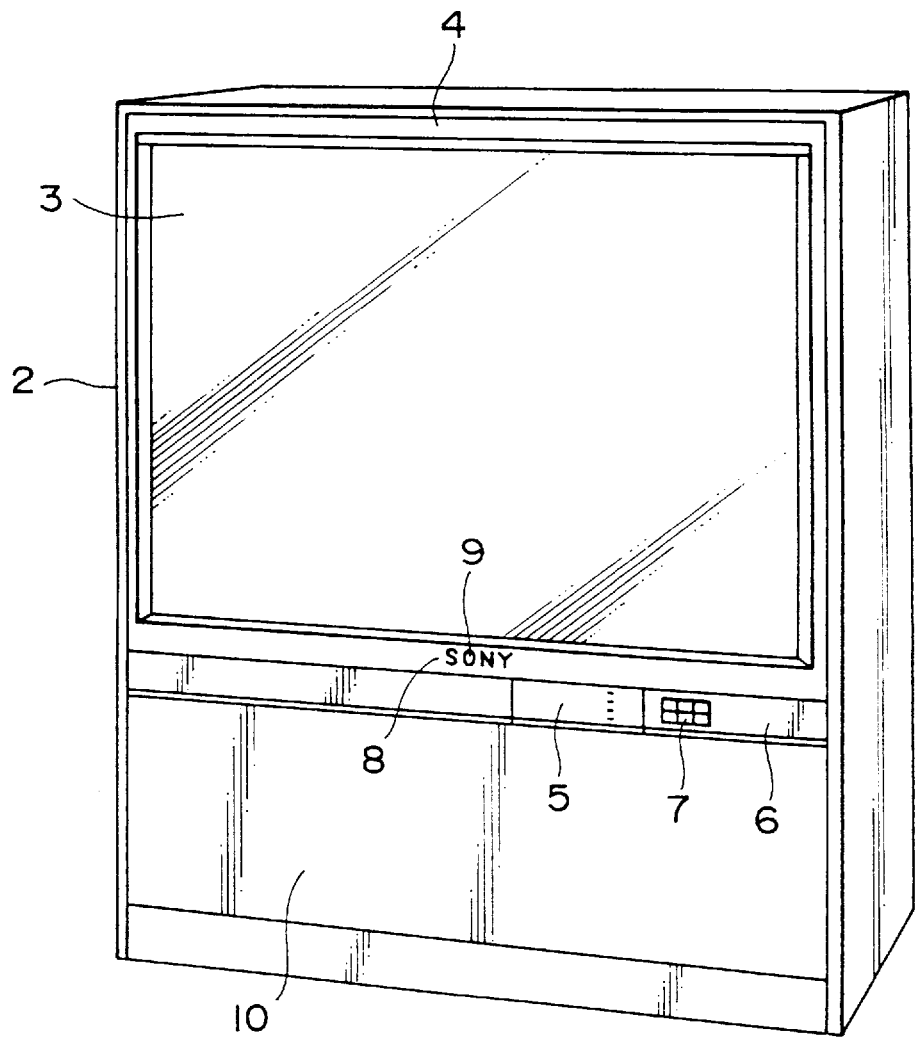
FIG. 1 is an external perspective view of a rear projection television set which is a preferred embodiment of the electronic apparatus according to the present invention.

FIG. 1 is an external perspective view of the embodiment representing an exemplary rear projection television set for use in a home-theater AV system.

In this view, reference numeral 1 denotes the entirety of the projection television set. There are included a cabinet 2 constituting the projection television set; a screen 3 composed of a lenticular lens, Fresnel lens or the like; a frame 4 bordering the periphery of the screen 3; and a front door 5 disposed on the front face of the cabinet 2 to conceal video and audio input/output terminals.

Reference numeral 6 denotes an operating panel provided on the front face of the cabinet 2. Also shown are an operating element group 7 where various elements are arranged to be manipulated for adjusting the sound volume, changing channels and so forth in the operating panel 6; a logo plate 8 attached to the frame 4 by adhesive means or the like and having characters thereon to signify a maker's name, a trade name, a model number and so forth; and a light receiving window 9 for receiving, e.g., an input infrared command signal supplied from an unshown remote commander. In this embodiment, the light receiving window 9 is formed in a blank portion of a character on the logo plate 8. Further shown is a loudspeaker compartment 10 disposed in a lower region of the cabinet 2 for housing loudspeakers therein.

Figure 2:
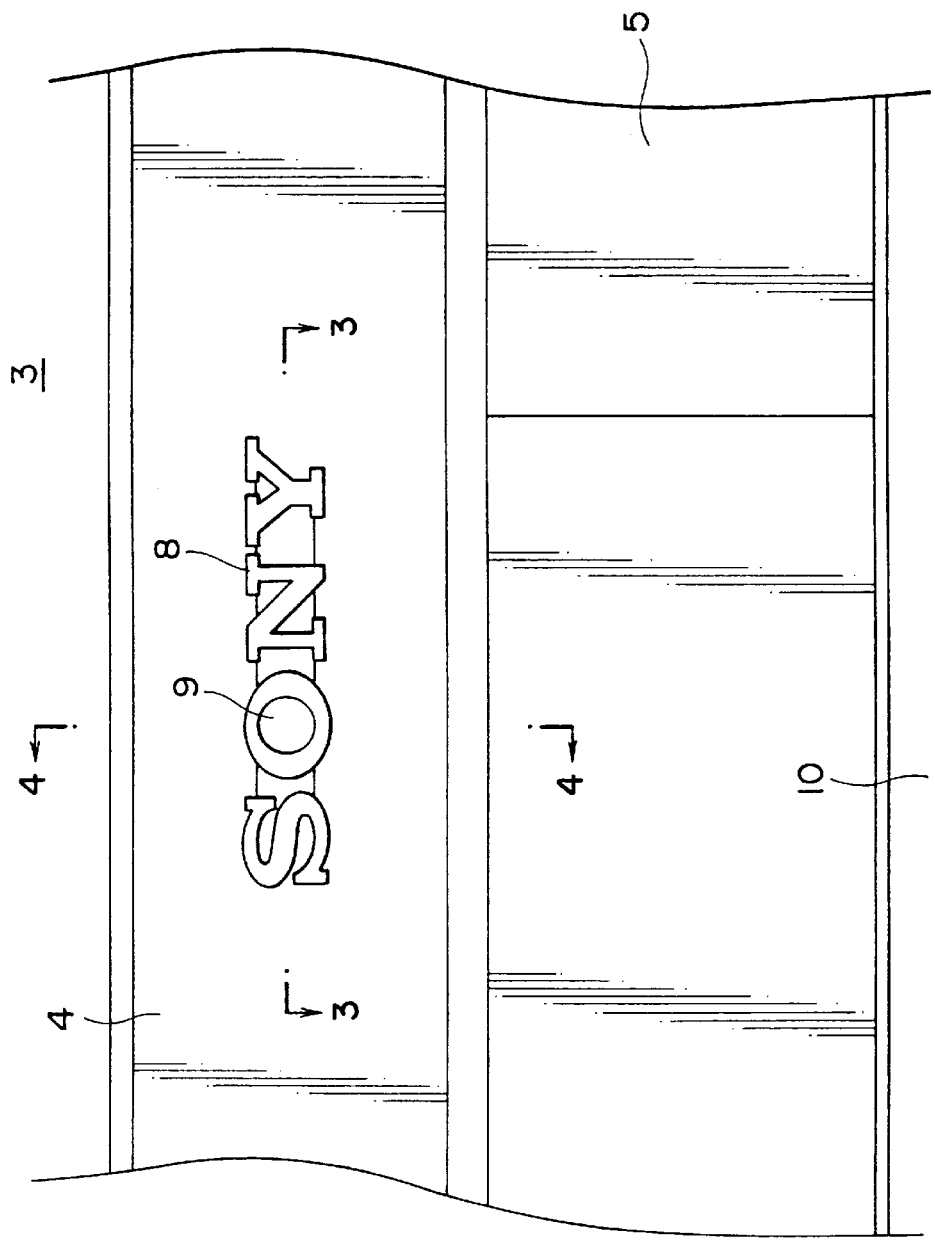
FIG. 2 is an enlarged view of the vicinity of a log plate in the rear projection television set of the embodiment.

FIG. 2 is an enlarged view of the vicinity of the logo plate 8 shown in FIG. 1. As illustrated, the logo plate 8 in this embodiment is composed of, e.g., four characters "SONY" of an alphabet. And the light receiving window 9 is formed in the character "O" which is the second of the four characters when counted from the leftmost.

Since the light receiving window 9 is formed in the character "O" on the logo plate 8, the window 9 is less conspicuous than in the conventional case where it is formed in some other portion of the casing 2, so that the external design is not spoiled at all in appearance.

Therefore, even in case the rear projection television set 1 is embedded in a wall by the user's unique customization in such a manner that merely the screen 3 and the frame 4 are seen on the wall, it never occurs that the light receiving window 9 alone is conspicuous, and still a command signal supplied from a remote commander can be inputted properly.

The portion of the logo plate 8 corresponding to the light receiving window 9 may be composed of ABS resin or the like having an infrared transmittivity higher than 80 percent.

Figure 3:
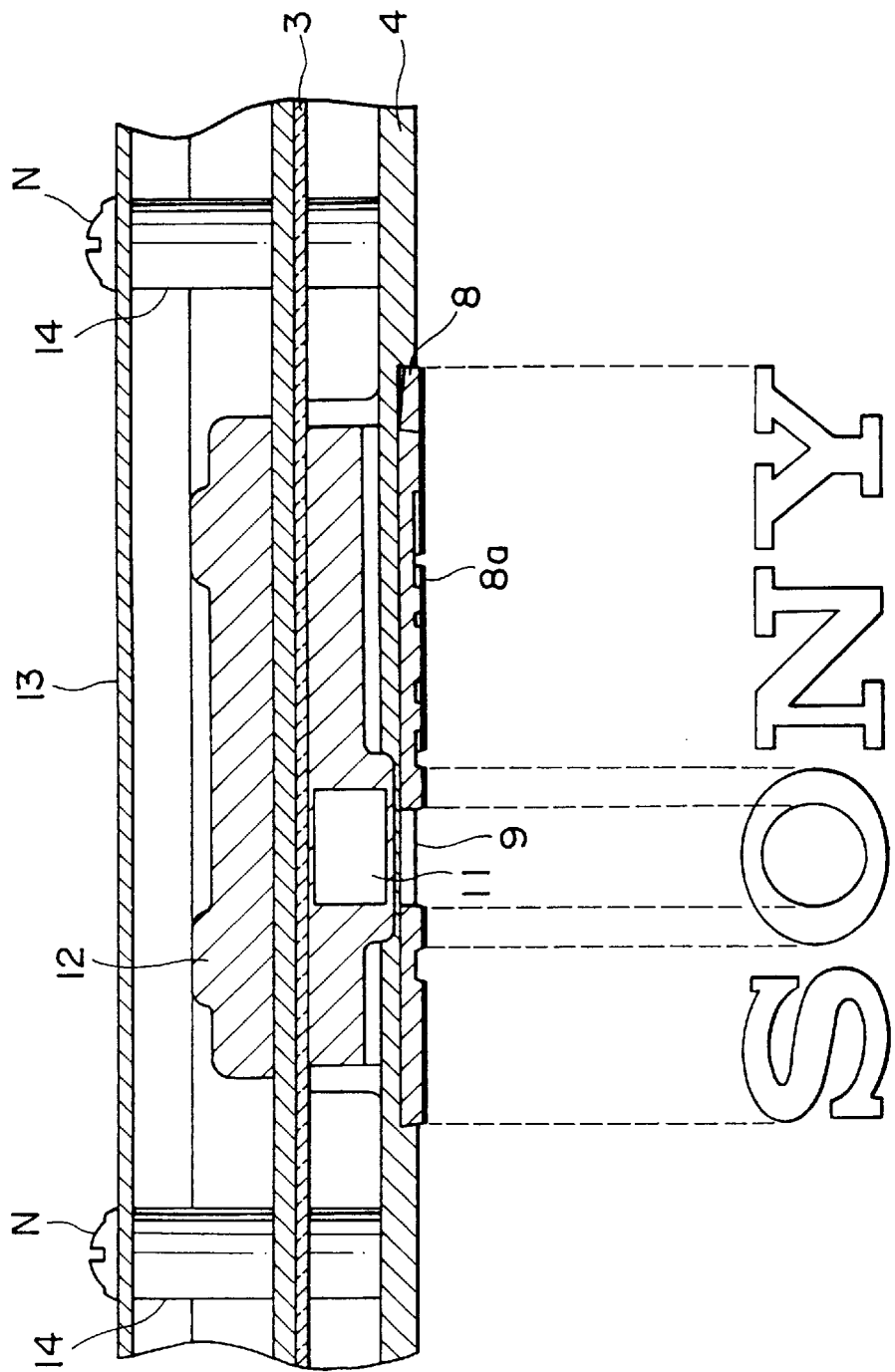
FIG. 3 is a sectional view taken along the line 3—3 shown in FIG. 2.
Figure 4:
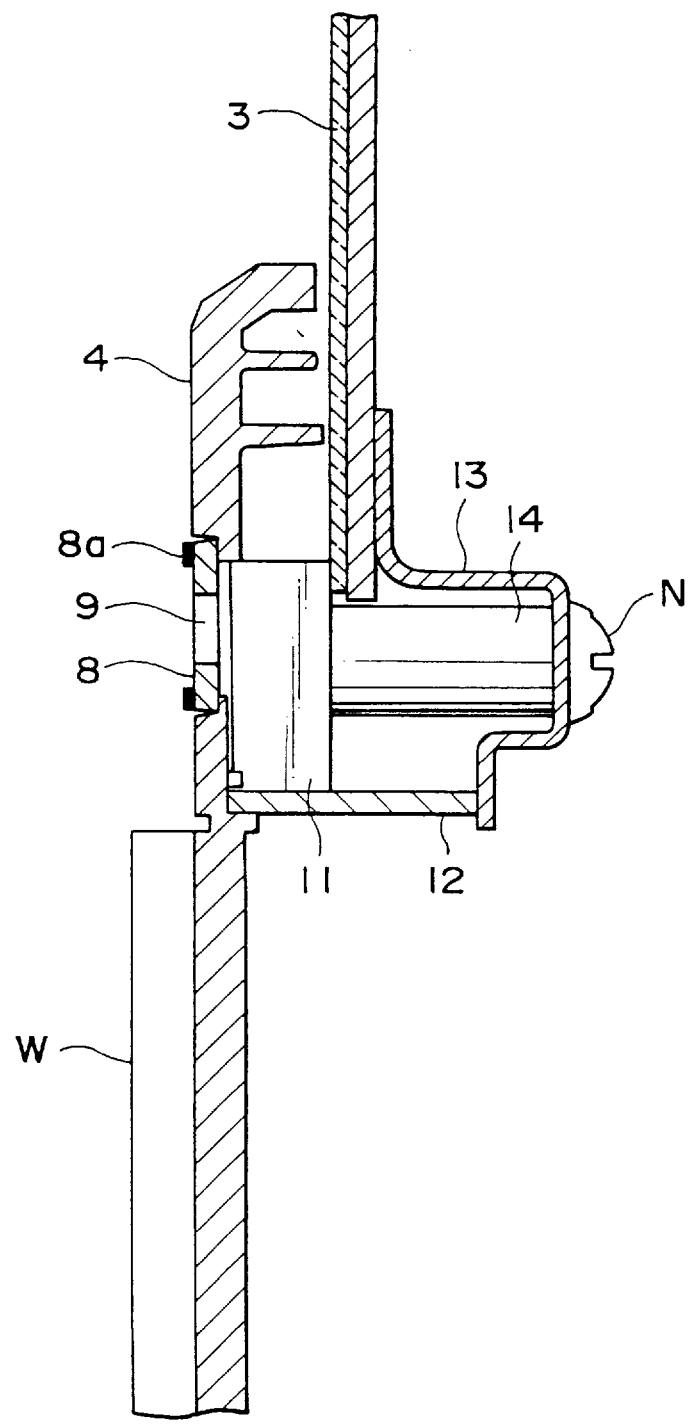
FIG. 4 is a sectional view taken along the line 4—4 shown in FIG. 2.

FIGS. 3 and 4 are sectional views representing the above case, in which FIG. 3 shows a section taken along the line 3—3 in FIG. 2, and FIG. 4 shows another section taken along the line 4—4 in FIG. 2. That is, these diagrams illustrate the character "O" on the logo plate from side and above, respectively.

In these diagrams, there are included a wall W concealing any other component parts than the screen 3 and the frame 4; a decorative foil 8a applied to the surfaces of the characters "SONY" on the logo plate 8; and an infrared sensor 11 disposed in a stage posterior to the light receiving window 9 and serving to sense an input command signal received through the window 9. The command signal thus inputted to the infrared sensor 11 is demodulated and then is supplied to an unsewn controller where various control actions are executed. There are further shown a printed circuit board 12 where the infrared sensor 11 is mounted, a board holder plate 13 for holding the printed circuit board 12 and fastening the same to the cabinet 2, and a support 14 into which a set-screw N for fixing the board holder plate 13 to the cabinet 2 is screwed.

As illustrated, the light receiving window 9 is formed by utilizing a center blank portion of the character "O" on the logo plate 8, and the infrared sensor 11 is disposed in a stage posterior thereto, whereby a command signal supplied from a remote commander can be inputted exactly as in the conventional apparatus, so that various control actions can be executed properly.

And due to disposition of the infrared sensor 11 immediately posterior to the light receiving window 9, it is no longer necessary to employ the light guide tube 35 and the tube bracket 36 shown in the conventional example of the prior art, hence reducing the number of required component parts and realizing curtailment of the production cost.

Although a description has been given above on the exemplary embodiment where the light receiving window 9 is formed in a blank portion of the character "O" on the logo plate, it is also possible to form the light receiving window 9 in a space between the characters "N" and "Y". More specifically, if a space of a predetermined area is existent in a blank portion of any character/figure or between any characters/figures, the light receiving window 9 can be formed in the space regardless of its position.

In a modification, the light receiving window 9 may be used as a light emitting window for supplying a command signal from the electronic apparatus to an external apparatus. In this case, a light emitter means for outputting an infrared command signal or the like is disposed posterior to the light emitting window.

It is to be noted that the present invention is applicable not only to the rear projection television set 1 shown in FIG. 1 but also to any other electronic apparatus operable by a remote commander, such as a television receiver, a laser disk player or a mini-disk player.

Now some examples of spaces for the light receiving window 9 in characters other than the above-described "SONY" will be explained below.

FIGS. 5a through 5h show examples of spaces where the light receiving window 9 is disposed in a blank portion of other characters or therebetween. In these examples, each hatched portion S signifies a space where the light receiving window 9 is formable.

Figures 5A, 5B, 5C, 5D, 5E, 5F, 5G, 5H:
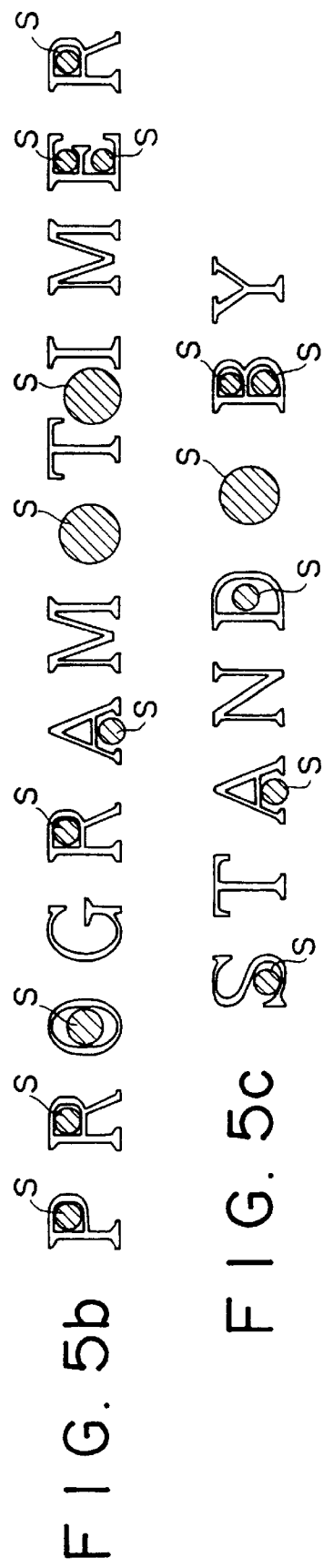
FIGS. 5a through 5h illustrate examples of spaces where light receiving windows are formed in blank portions of or between characters.
Figure 6:
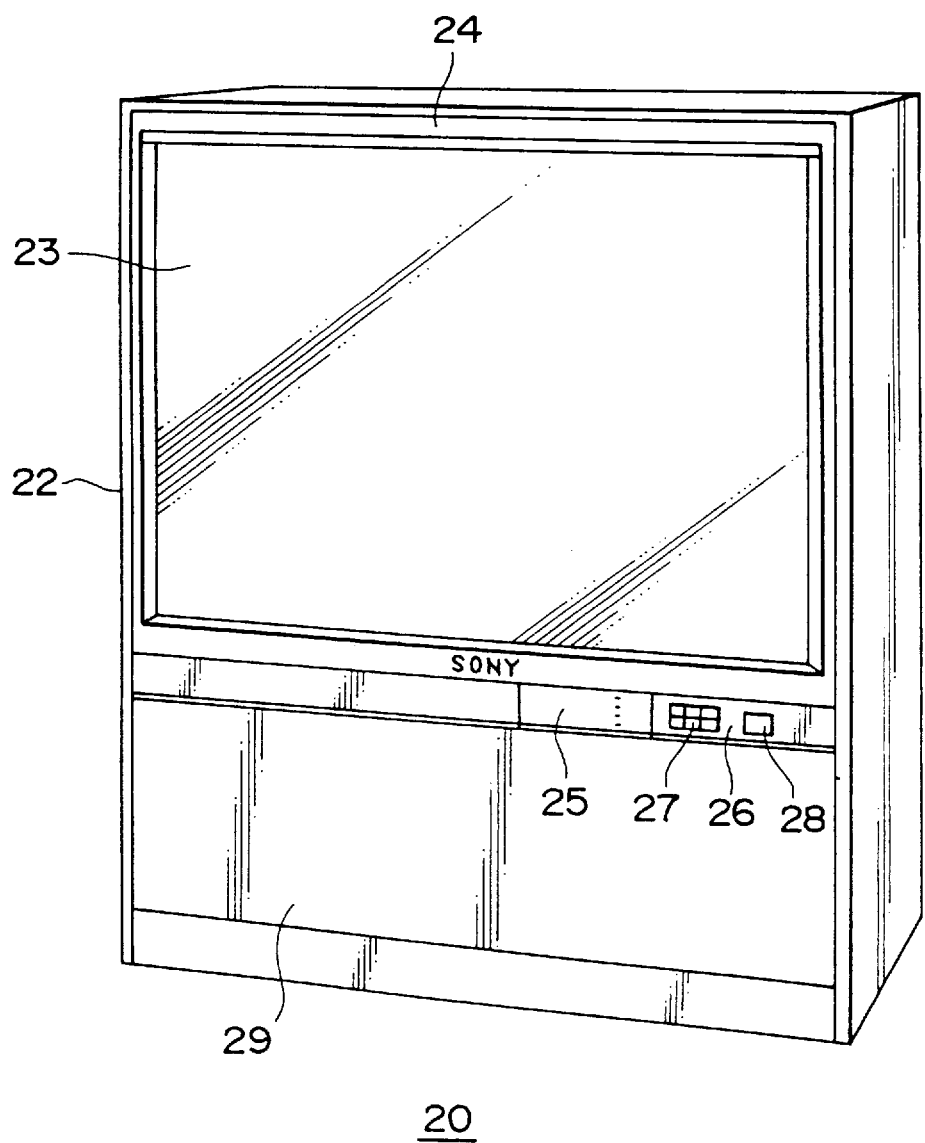
FIG. 6 is an external perspective view of a conventional rear projection television set according to the prior art.
Figure 7:
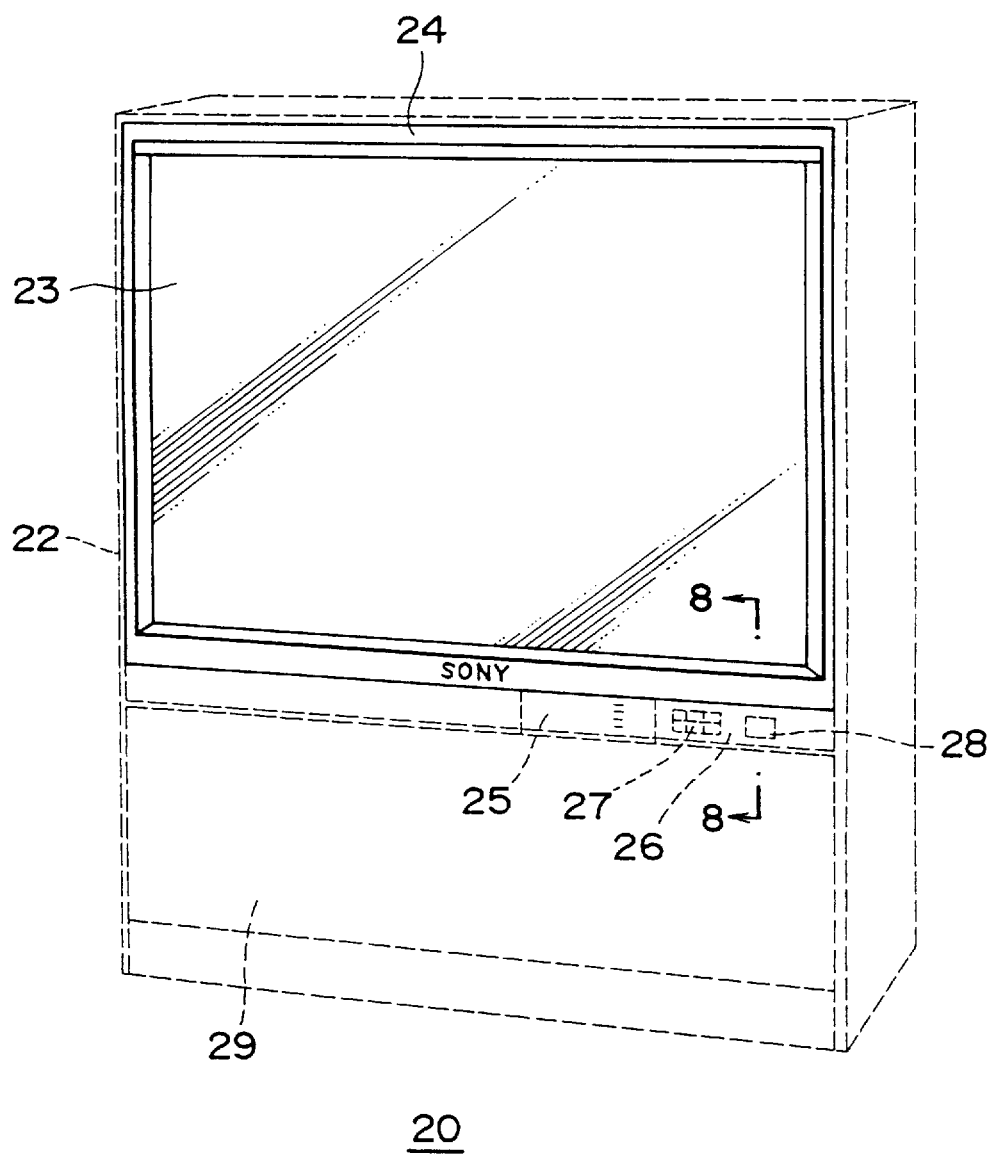
FIG. 7 illustrates some component parts of the conventional rear projection television set seen on a wall when the television set is embedded in the wall.
Figure 8:
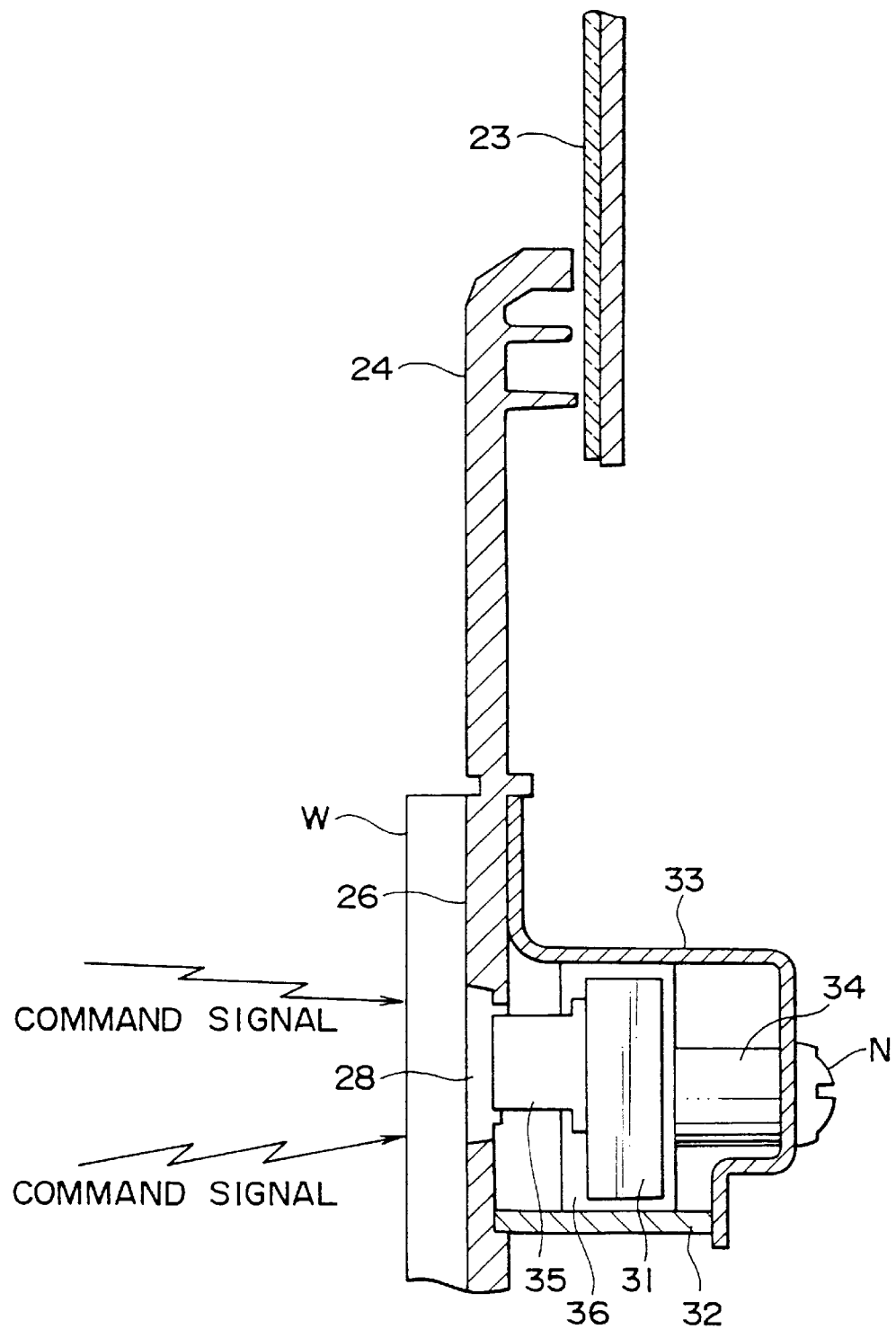
FIG. 8 is a sectional view taken along the line 8—8 shown in FIG. 7.

The characters "POWER" shown in FIG. 5a are inscribed in the vicinity of, e.g., a power supply indicator, and a space S is formed in each of blank portions of the characters "P", "O" and "R".

The characters "PROGRAM TIMER" shown in FIG. 5b are inscribed in the vicinity of an indicator which is turned on during a timer reservation, and a space S is formed in each of blank portions of the characters "P", "R", "O", "A" and "E". In this case, a space S is formed also between the characters "M" and "T", and between the characters "T" and "I" as well.

Further the characters "STAND BY" shown in FIG. 5c are inscribed in the vicinity of an indicator turned on during a standby mode, and a space S is formed in each of blank portions of the characters "A", "D", "B" and also between the characters "D" and "B".

FIGS. 5d and 5e show characters "BS" and "CS" inscribed for signifying whether a BS tuner and a CS tuner are incorporated or not, respectively. And FIGS. 5f and 5g show characters "MD" and "LD" which are inscribed on, e.g., a mini disk player and a laser disk player respectively. In this case also, a space S is formed in a blank portion of each character.

When numerals are inscribed in addition to the above alphabet characters, as shown in FIG. 5h for example, it is possible to form a space S in a blank portion of each of numerals "2", "3", "5", "0", "6", "8" and "9". The inscribed characters may be Japanese hiragana, katakana or the like as well. The styles of the characters and the numerals shown in FIG. 5a through 5h are general ones, and the light receiving window 9 is formable in any of characters and numerals of various styles if an adequate space S can be ensured therein.

Although not shown, even in case there is inscribed any unique figure or pattern designed by a maker for example, such as a particular logo or design other than an ordinary character or numeral, it is still possible to form the light receiving window 9 if an adequate space S can be ensured in that unique figure or pattern.

When a plurality of light receiving windows 9 are provided by utilizing a plurality of spaces S, the range of receiving an input command signal supplied from a remote commander can be widened to consequently enhance the operability of the remote commander as well.

The above embodiment represents an exemplary case where the light receiving window 9 is formed by utilizing a blank portion of the character inscribed on the logo plate 8. And in addition thereto, such light receiving window 9 can be formed by utilizing a blank portion of a character/figure printed directly on the surface of the frame 4, or by utilizing a blank portion of a character/figure molded three-dimensionally on the surface of the frame 4.

According to the electronic apparatus of the present invention, as described hereinabove, a light receiving window for receiving an input control signal supplied from a remote commander is formed in a blank portion of and/or between characters/figures inscribed on the front face of the apparatus cabinet. Therefore, in case the present invention is applied to a television receiver or a projector which is embedded in a wall by user's customization in such a manner that merely some parts of the cabinet such as a display screen and a frame thereof are seen on the wall, it is still possible to properly receive the command signal without spoiling the external design.

Furthermore, a light guide tube and its bracket needed immediately posterior to the light receiving window in the prior art are no longer necessary, whereby it is rendered possible to achieve additional advantages of reducing the number of required component parts and curtailing the production cost.

Although the present invention has been described hereinabove with reference to the preferred embodiment thereof, it is to be understood that the invention is not limited to such embodiment alone, and a variety of other modifications and variations will be apparent to those skilled in the art without departing from the spirit of the invention.

The scope of the invention, therefore, is to be determined solely by the appended claims.

What is claimed is:

1. An improved electronic apparatus having a window in a cabinet through which an input command signal supplied from a remote commander passes to execute various control actions, so that desired operations can be performed by manipulating said remote commander, and having a frame bordering a periphery of a video screen in said cabinet for providing a demarcation between the video screen and the remainder of said cabinet and for visually setting the video screen apart from the remainder of said cabinet, comprising:

light sensor means for sensing said input command signal;

means for mounting said light sensor means posterior to an immediately adjacent said window, such that no intervening elements are arranged between said light sensor means and said window; and characters inscribed on a front surface of said frame, wherein said window is formed in one of a blank portion of said characters inscribed on said front surface of said frame and a blank portion between said characters inscribed on said front surface of said frame, whereby said characters serve as a target to which the command signal from the remote commander is aimed in order to insure that the command signal reaches said light sensor means.

2. The electronic apparatus according to claim 1, wherein said characters are formed on a logo plate attached to said frame.

3. The electronic apparatus according to claim 1, wherein said characters are molded three-dimensionally on said frame.

4. The electronic apparatus according to any of claims 1 to 3, wherein a light emitter means for outputting said command signal is disposed in a stage posterior to said window.

5. The electronic apparatus according to any of claims 1 to 3, wherein a plurality of said windows are formed in blank portions of and/or between said characters.

* * * * *